J. B. COFFRON.
TRACTOR.
APPLICATION FILED JULY 10, 1909.
983,256.
Patented Jan. 31, 1911.
2 SHEETS—SHEET 2.
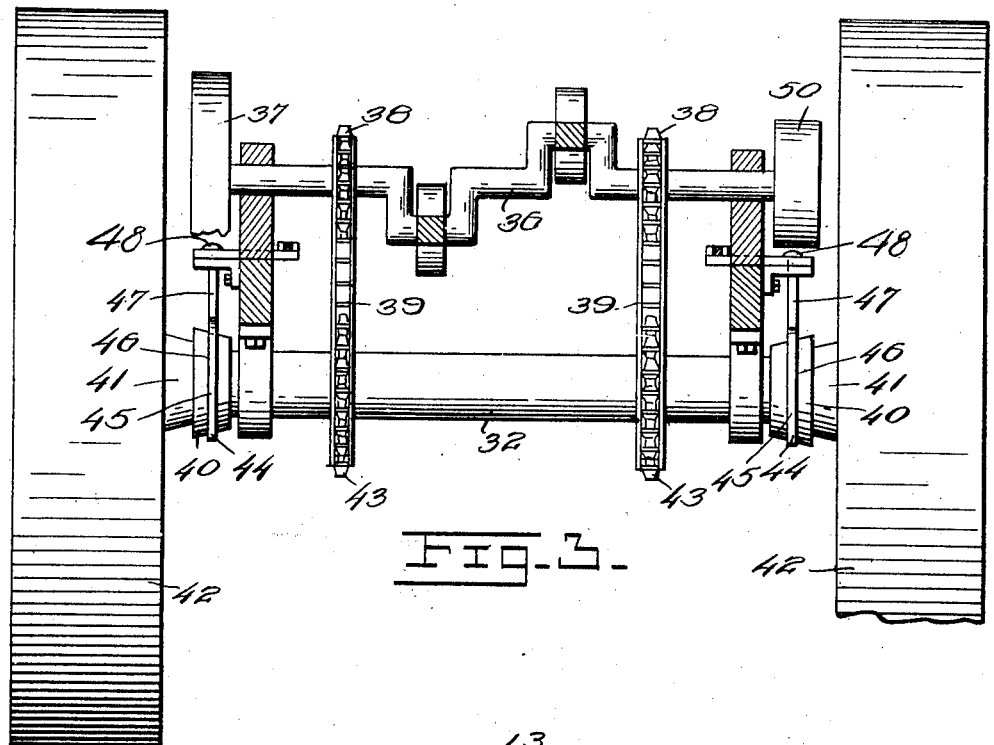
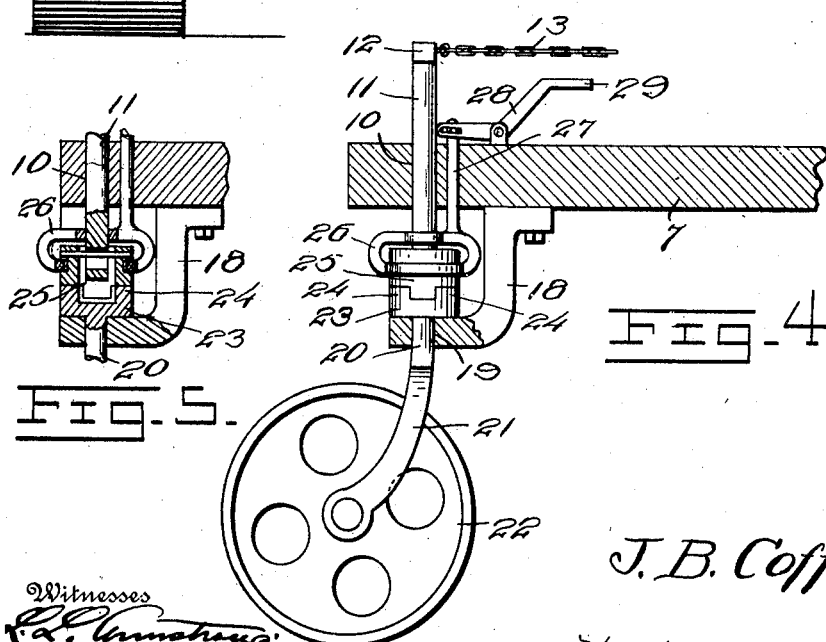
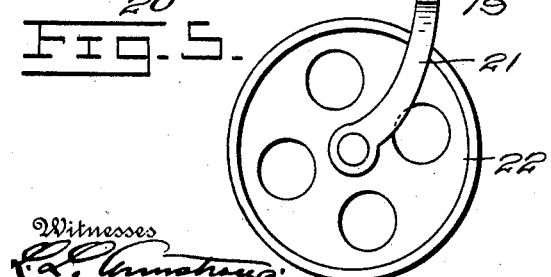
Inventor
J. B. Coffron
By Woodward & Chandler
Attorneys
Witnesses

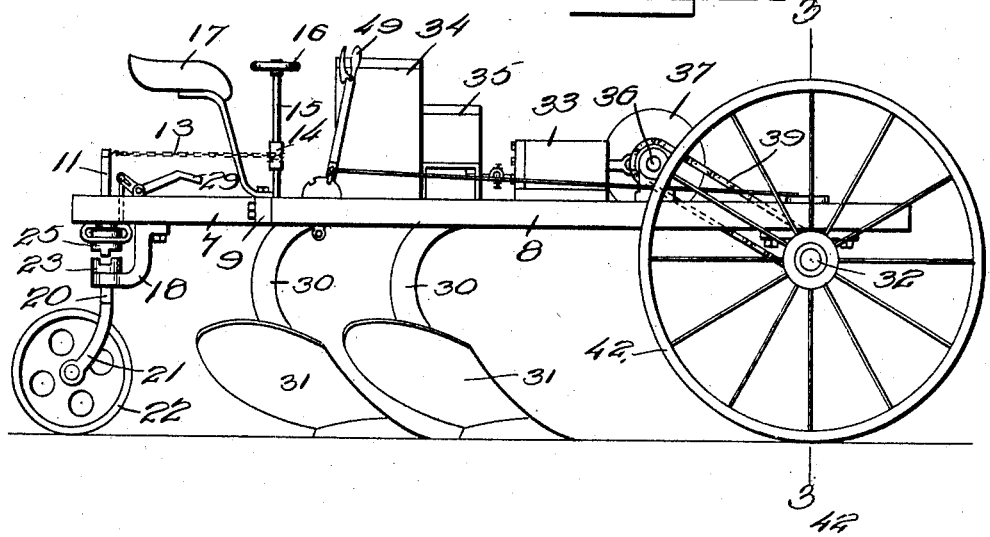

UNITED STATES PATENT OFFICE.

JOHN B. COFFRON, OF EUGENE, OREGON.

TRACTOR.

983,256.  Specification of Letters Patent.  Patented Jan. 31, 1911.

Application filed July 10, 1909. Serial No. 506,878.

*To all whom it may concern:*

Be it known that I, JOHN B. COFFRON, a citizen of the United States, residing at 444 West Fifth street, Eugene, in the county of Lane and State of Oregon, have invented certain new and useful Improvements in Tractors, of which the following is a specification.

This invention relates to motor driven apparatus and more particularly to motor plows, and has for its object to provide a motor plow including driving motors and traction wheels arranged for individual connection with the driving shaft so that one wheel may be disconnected to turn the machine in one direction or the other wheel may be disconnected to turn the machine in the opposite direction, a steering caster being provided and arranged to facilitate the just described operation.

Another object is to provide a structure in which the frame will be so arranged that the furrow side will be raised or lowered as desired.

Other objects and advantages will be apparent from the following description and it will be understood that changes in the specific structure shown and described may be made within the scope of the claims, and that any suitable materials may be used without departing from the spirit of the invention.

In the drawings forming a portion of this specification, and in which like numerals of reference indicate similar parts in the several views, Figure 1 is a side elevation of the present plow, Fig. 2 is a top plan, Fig. 3 is a transverse section taken on the line 3—3 of Fig. 1, through the driving shaft showing the means for connecting the wheels with the shaft, Fig. 4 is a vertical section through the foot trip mechanism for releasing the steering caster, Fig. 5 is a detailed view in section of the caster mounting.

Referring now to the drawings, there is shown a plow comprising a horizontally extending frame 6 including parallel side members 7 and 8. The side member 7 extends rearwardly beyond the member 8, and the member 8 has a transverse member 9 secured to its rearward end and also secured to the member 7 forwardly of the rearward end thereof. The rearward end of the member 7 has a vertical passage 10 formed therein which receives a vertically extending revoluble shaft 11. This shaft 11 has a transverse bar 12 mounted upon its upper end, and this bar 12 has the end of a steering chain 13 secured thereto, this steering chain being engaged around a drum 14 carried by a steering shaft 15 extending vertically from the frame 6 having a steering wheel 16 at its upper end located within reach of the occupant of a seat 17 mounted upon the frame. A downwardly and rearwardly extending bracket 18 is secured to the member 7 and at its lower end positioned beneath the opening 10 and provided with a passage 19 in alinement with the opening 10. This passage 19 receives the stem 20 of a wheel yoke 21 in which there is journaled a caster wheel 22.

The stem 20 has an enlarged head 23 secured upon its upper end, which head prevents disengagement of the stem from the bracket 18, and is provided upon its top with clutch fingers 24. A sliding clutch member 25 is mounted upon the lower portion of the shaft 11 for movement into and out of engagement with the clutch fingers 24, and a yoke 26 is connected with the clutch member 25 for rotation of the clutch member with respect thereto, the yoke having a link 27 pivoted thereto and pivoted to a bell crank lever 28 mounted upon the frame beam 7, this bell crank lever being connected with a foot trip member 29 for operation by the foot of an occupant of the seat 17 to raise the clutch member 25 and thus release the caster wheel 22 to permit free swinging thereof. When the parts are in operative coengagement, it will be understood that the wheel may be turned by means of the steering wheel 16 to properly guide the machine.

Depending straps 30 are carried by the frame 6, and these straps carry plows 31 at their lower ends. At the forward portion of the frame 6, there is mounted a transverse shaft 32. There are two parallel gasolene motors 33 mounted on the frame. As shown, suitable water and fuel supply tanks 34 and 35 are provided for the motors. The motors are connected with a common power shaft 36, having a fly wheel 37 at one end and carrying sprocket wheels 38 with which there are engaged chains 39, extending downwardly. Friction clutch members 40 are mounted upon the shaft 32 and have conical recesses in their outer ends arranged to receive conical inwardly directed projections 41 carried by the traction wheels 42 which are loosely mounted upon the outer ends of the shaft 32. The clutch members 40 have sprockets 43 which receive the chains 39, and yokes 44 have fingers 45 which are engaged in peripheral grooves 46 of the clutch members 40, these yokes having stems 47 which are pivoted as shown at 48 for movement of the clutch members into and out of engagement with the projections 41. Hand levers 49 are provided for individual operation of these clutch members, so that the wheels 42 may be individually connected with the driving mechanism to turn the machine in either direction as hereinbefore stated.

As will be understood, when the plow is to be turned in one direction, the foot trip is operated to release the wheel 22 so that it may swing freely, and one of the traction wheels 42 is released, the other wheel being operated to turn the machine with the dead wheel as a pivot. The operation is of course reversed to turn the machine in the opposite direction. Under normal conditions the machine is steered by means of the wheel 16 which communicates motion to the caster wheel 22. The plowing operation of the machine will be understood without detailed description. A belt pulley 50 is carried by one end of the shaft 36 for the transmission of power to other mechanisms.

What is claimed is:—

1. In a power driven apparatus, the combination with a frame including two parallel members, one of said members extending rearwardly beyond the other, a transverse member connected to the last named parallel member forwardly of its rearward end and connected to the rearward end of the other of said parallel members, of a downwardly and rearwardly extending bracket carried by the rearward end of the rearwardly extended one of said parallel members, a yoke having a stem revolubly engaged in the bracket, a shaft journaled in the frame member above the bracket, detachable clutch connections between the shaft and the yoke, means for operating the detachable clutch connections, and a caster wheel mounted in the yoke.

2. In a power driven apparatus, the combination with a frame including two parallel members, one of said members projecting farther than the other, a uniting member connected to the last named parallel member inwardly of its projecting end, and connected to the end of the shorter parallel member, of a bracket carried by the projected end of the longer parallel member, a yoke having a stem engaged in the said bracket, a shaft journaled in the frame member above said bracket, clutch connections between said shaft and said yoke, means for operating the said clutch connections, and a caster wheel mounted in said yoke.

In testimony whereof I affix my signature, in presence of two witnesses.

JOHN B. COFFRON.

Witnesses:
ROBERT CHAMBERS,
J. W. WAGERS.